May 5, 1970        G. R. JOHNSON        3,509,797

MECHANISM FOR PRODUCING CUSHIONING DUNNAGE

Filed May 22, 1967        10 Sheets-Sheet 1

INVENTOR.
GEORGE R. JOHNSON
BY
Baldwin, Doran & Egan
ATTORNEYS

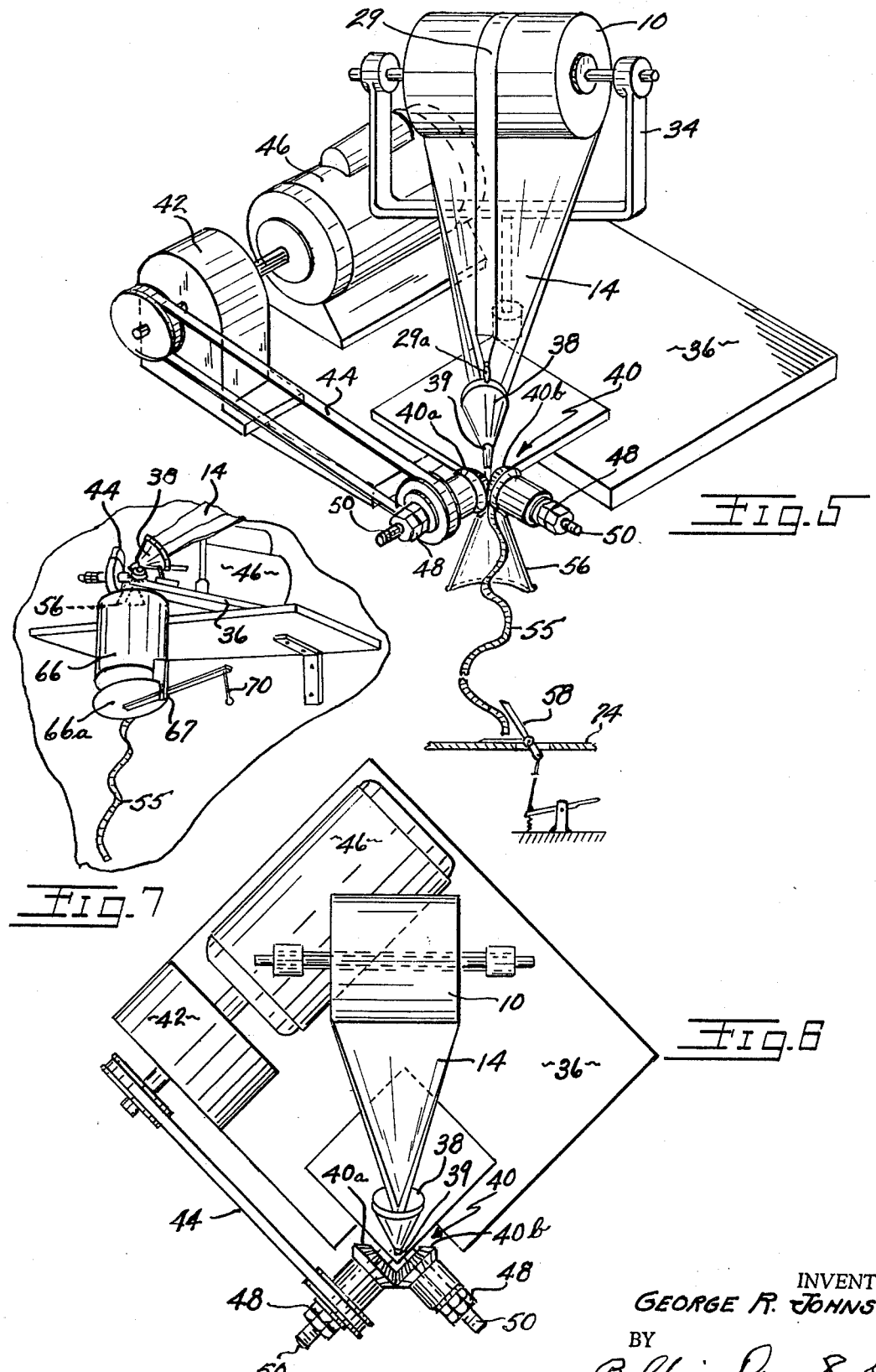

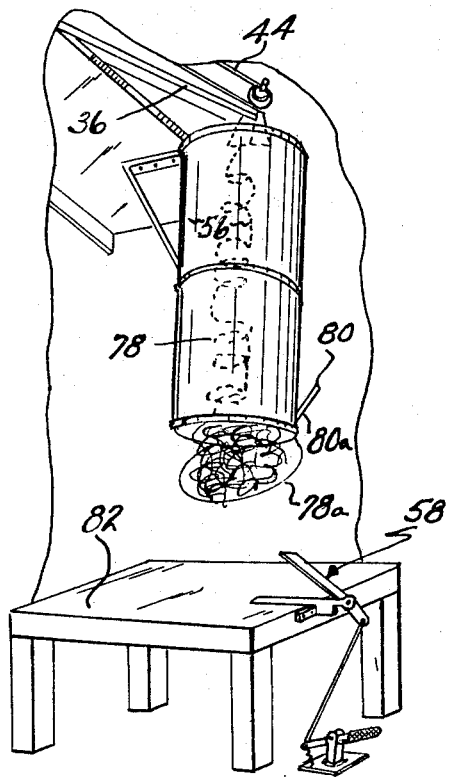
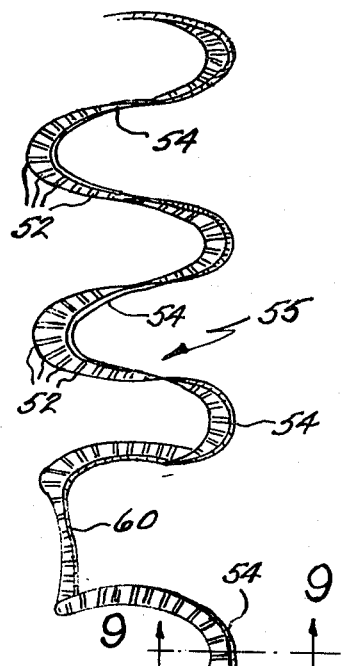
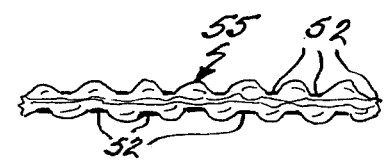
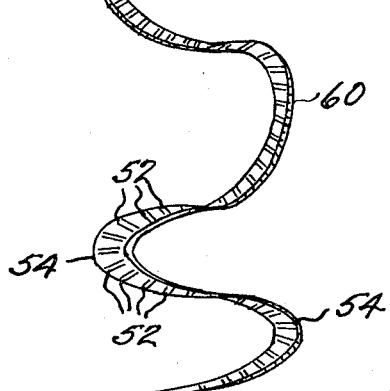
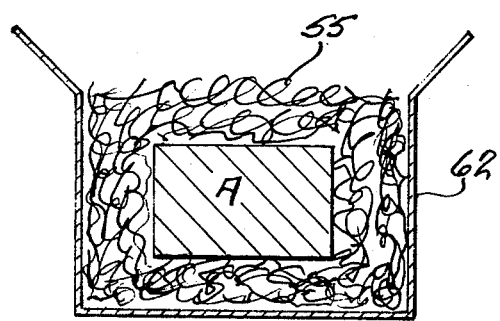

May 5, 1970 G. R. JOHNSON 3,509,797
MECHANISM FOR PRODUCING CUSHIONING DUNNAGE
Filed May 22, 1967 10 Sheets-Sheet 4
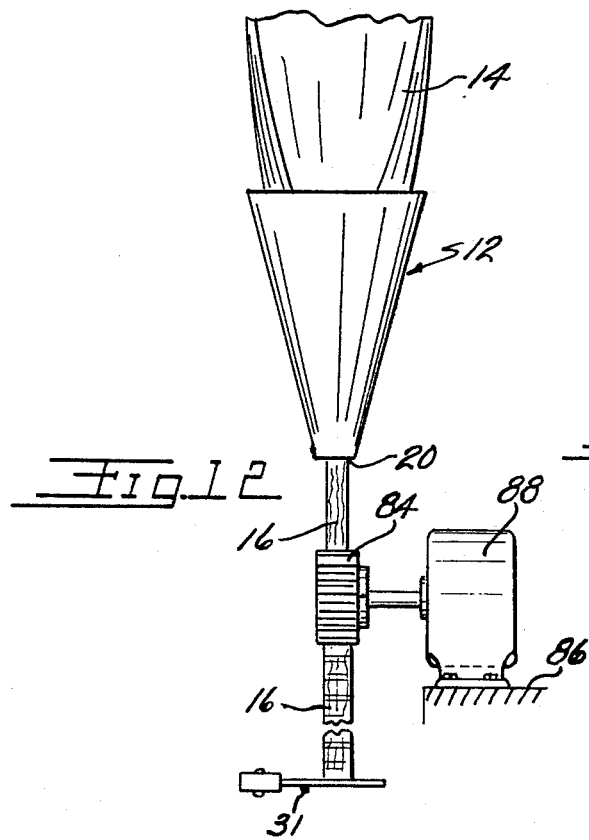
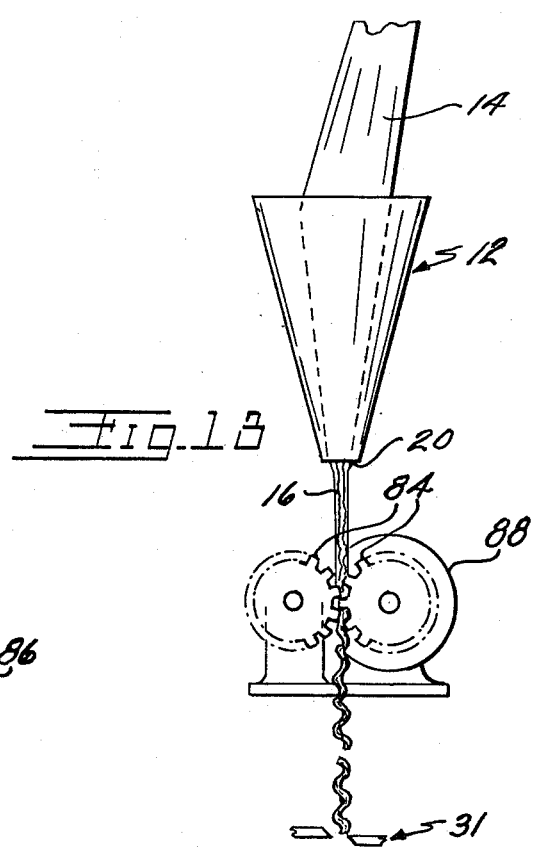
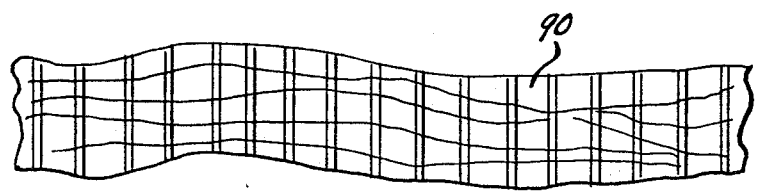
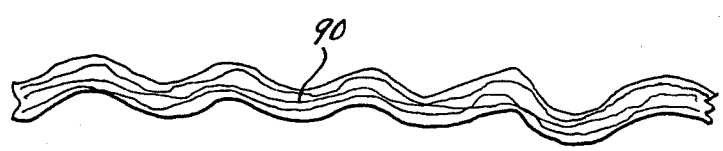
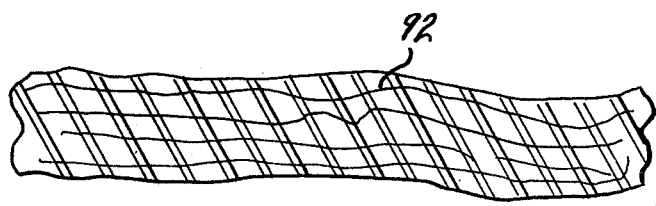
INVENTOR.
GEORGE R. JOHNSON
BY
Baldwin, Doran & Egan
ATTORNEYS

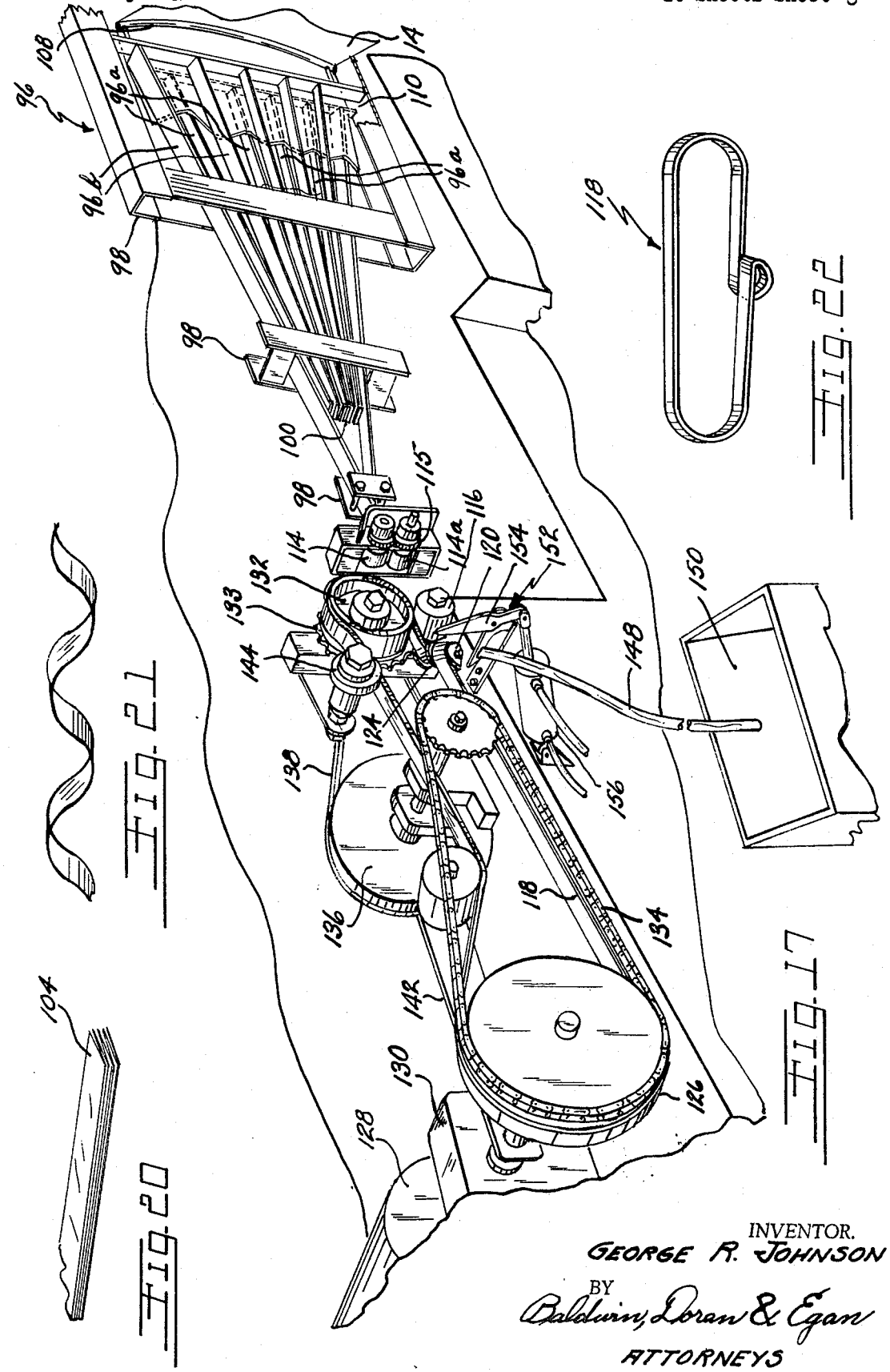

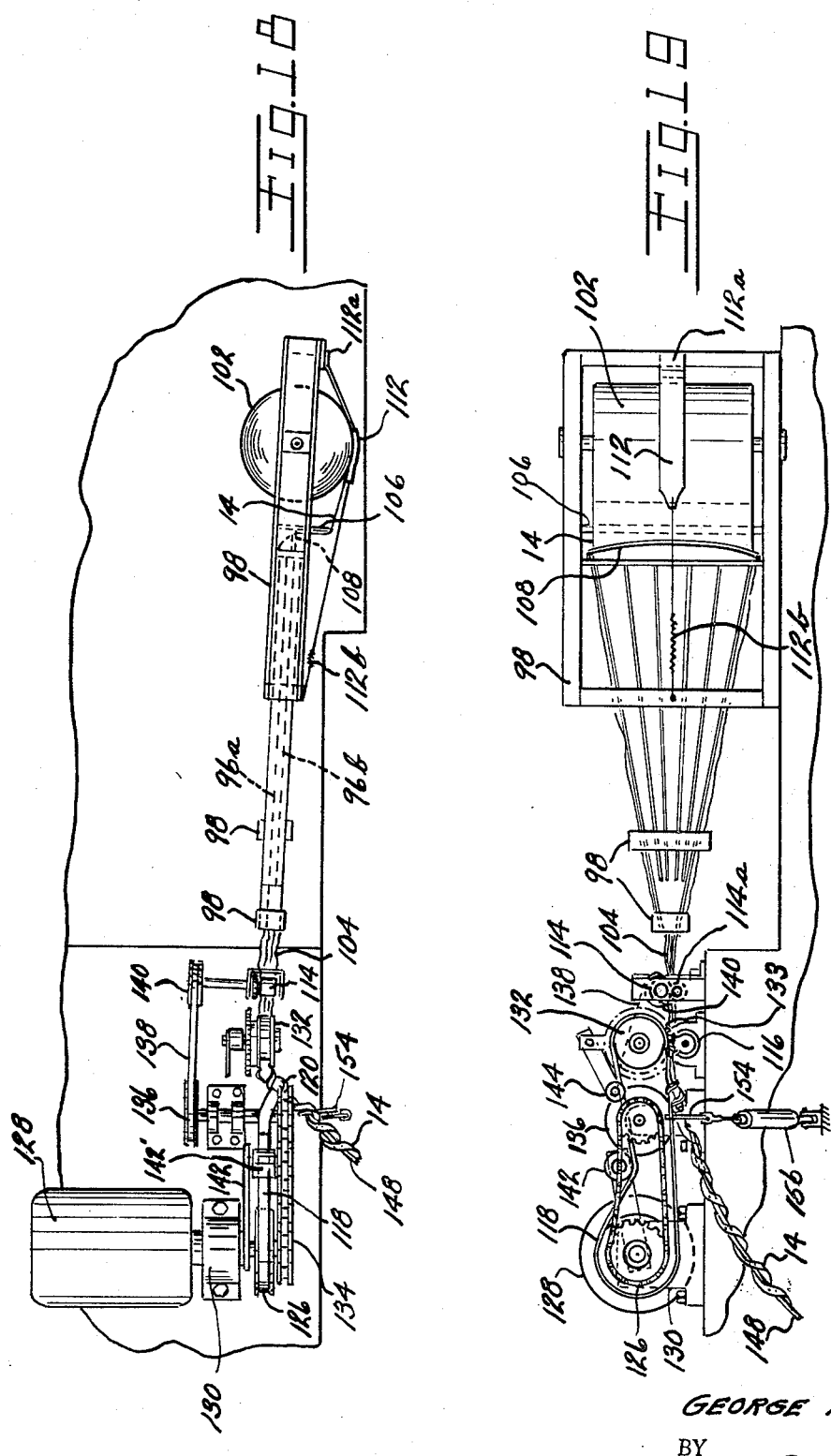

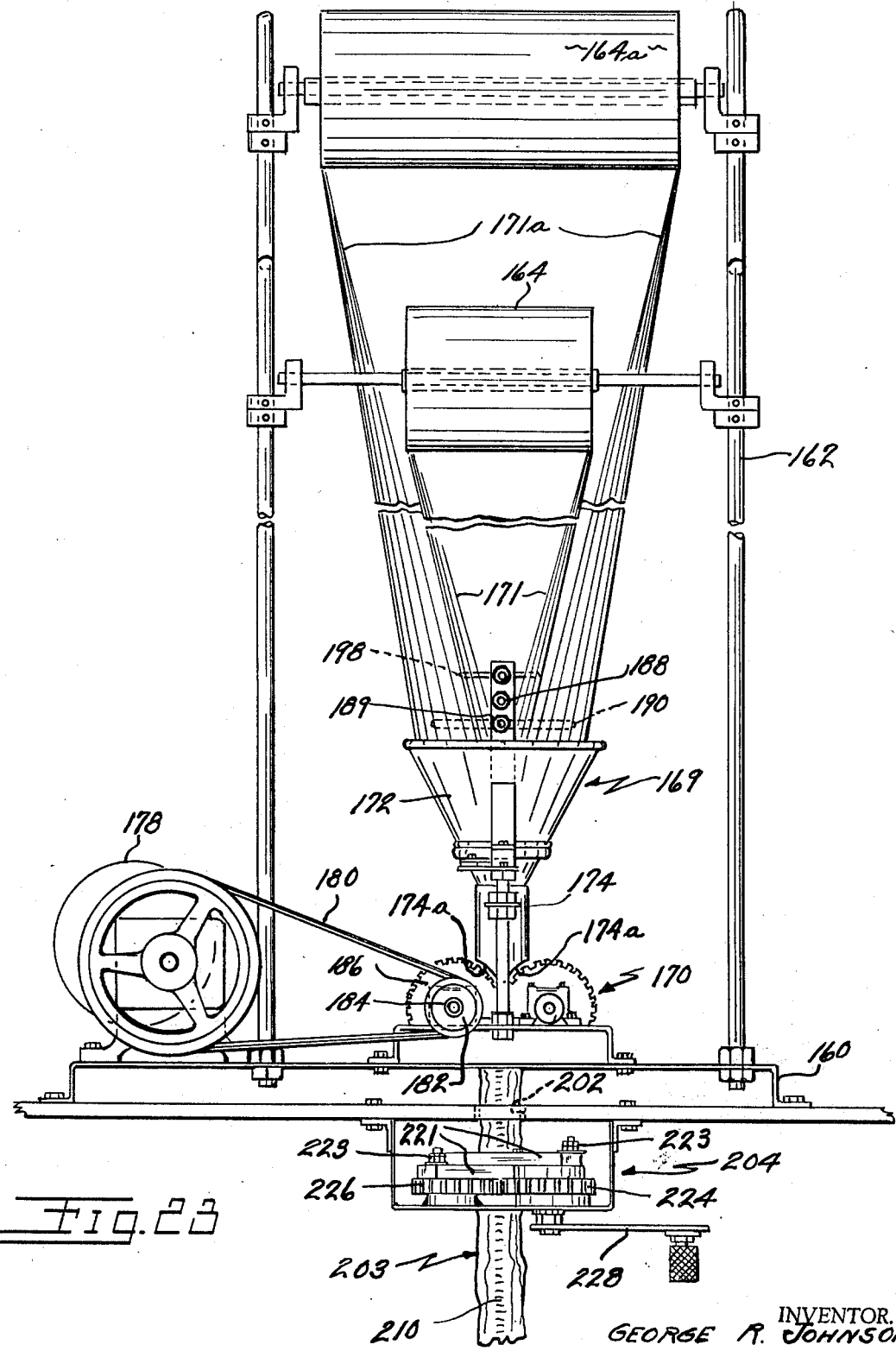

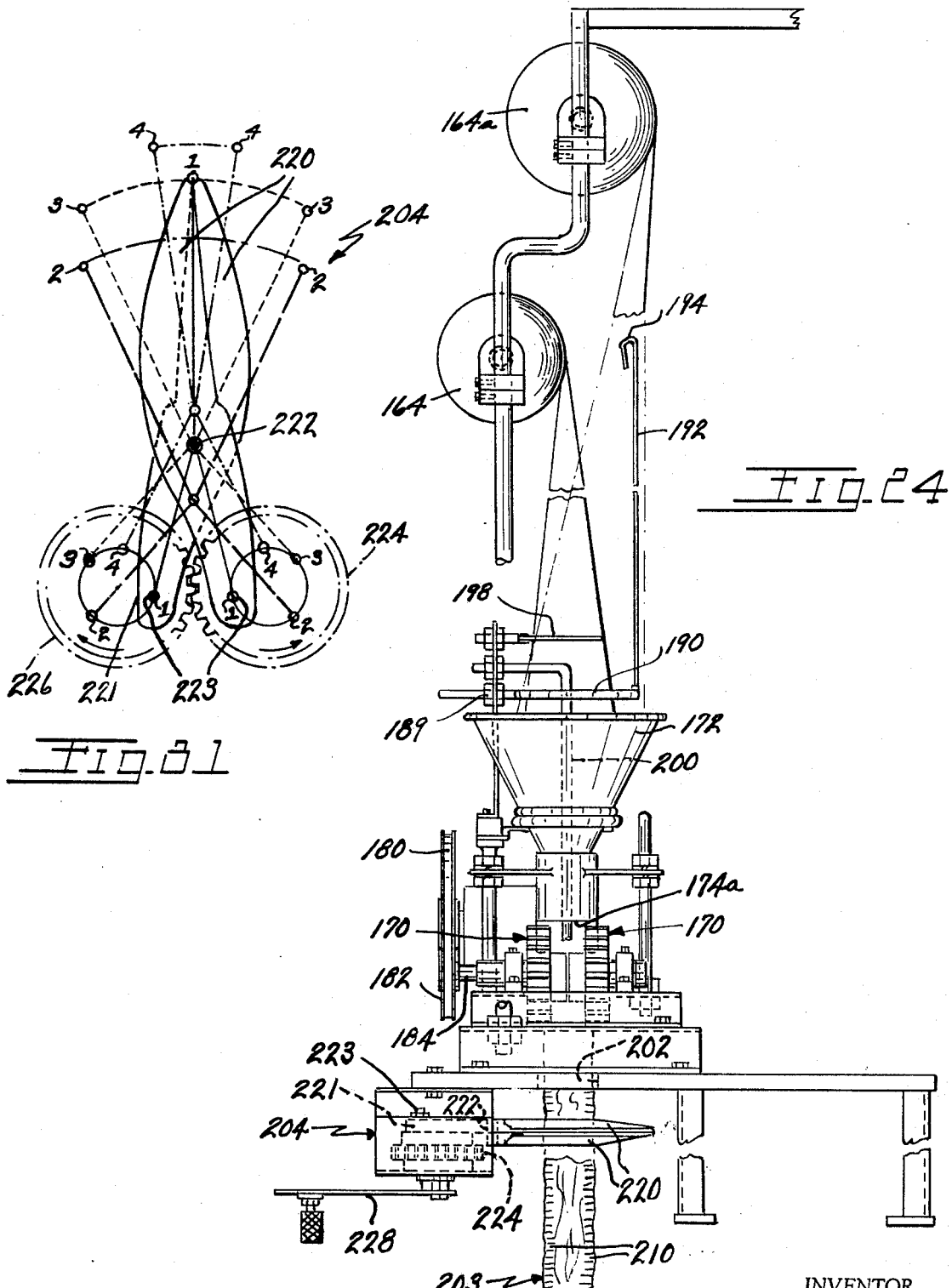

May 5, 1970  G. R. JOHNSON  3,509,797
MECHANISM FOR PRODUCING CUSHIONING DUNNAGE
Filed May 22, 1967  10 Sheets-Sheet 9

INVENTOR.
GEORGE R. JOHNSON
BY
Baldwin, Doran & Egan
ATTORNEYS

May 5, 1970     G. R. JOHNSON     3,509,797

MECHANISM FOR PRODUCING CUSHIONING DUNNAGE

Filed May 22, 1967     10 Sheets-Sheet 10

INVENTOR.
GEORGE R. JOHNSON
BY
Baldwin, Doran & Egan
ATTORNEYS

United States Patent Office 3,509,797
Patented May 5, 1970

3,509,797
MECHANISM FOR PRODUCING CUSHIONING DUNNAGE
George R. Johnson, Chagrin Falls, Ohio, assignor to The Arpax Company, Chagrin Falls, Ohio, a corporation of Ohio
Filed May 22, 1967, Ser. No. 640,145
Int. Cl. B31d 5/04; B65b 57/14; B65h 37/04
U.S. Cl. 93—1                                    16 Claims

ABSTRACT OF THE DISCLOSURE

The cushioning dunnage or packing producing mechanism in the preferred embodiment, comprises coacting bevel gears which draws a continuous web of sheet-like material, such as paper, through a crumpler mechanism, which in the preferred embodiment is a funnel-like arrangement through which the web of sheet-like material is drawn and formed into a relatively narrow strip or rope. The passage of the formed strip or rope of material through the beveled gears causes coiling or spiraling of the strip, and rotation of the coiled strip about its lengthwise axis. At a predetermined distance below the bevel gears, a resistance to this rotation causes an interruption of the regular helical or spiral formation of the strip, to kink the strip and interrupt the formation of a regular spiral, after which the strip once again is formed into regular spiral coils by the gears. This interruption in the spiral configuration of the strip insures that the formed spiral-like section of packing will not completely and uniformly collapse, when retracted or compressed, but instead will be formed into a tangled resilient mass, thereby materially increasing the resiliency of the packing for adequately cushioning articles in shipping containers and the like. Other embodiments of the invention are also illustrated, including one which utilizes a plurality of webs of the sheet-like material and which combines and forms such plurality of webs into an integral, resilient, tubular-like construction of dunnage.

---

This invention relates in general to mechanisms for producing packing material or cushioning dunnage as it is known in the art, and more particularly a dunnage producing mechanism embodying means for converting a continuous web of sheet-like material, such as paper, into generally resilient lengths of dunnage, for use in packing and cushioning articles or products in shipping containers and the like. The invention also relates to a method of producing dunnage and a novel dunnage product.

Various mechanisms are known in the art for producing lengths of packing material for use in packaging frangible or breakable articles in enclosing containers. One such mechanism is disclosed in U.S. Patent 2,882,-802 issued Apr. 21, 1959 to Charles Robert Walker and entitled "Crumpling Device." However, such prior art mechanisms are either too complex for the quality of dunnage produced, or they do not produce dunnage or packing material which has suitable resiliency, for giving good cushioning protection to articles disposed in shipping containers. Accordingly, the general practice has been to crumple paper material manually, with the packers crumpling the material and placing it in the shipping containers as needed. The latter method is inefficient and time consuming. Various other types of dunnage such as, for instance plastic dunnage, are known in the art, but these other types generally either require too much storage spacec or are too expensive for universal use.

The present invention provides a novel mechanism for effectively and efficiently producing paper dunnage, the latter having considerable resiliency for greatly improving the cushioning characteristics of the packing material or dunnage. The invention also provides a novel and economical method of producing packing material or dunnage of considerable resiliency, and a novel paper dunnage product which has resiliency characteristics heretofore unknown.

Accordingly, an object of the invention is to provide a novel mechanism for producing dunnage or packing material comprising a device for crumpling sheet material such as paper into elongated relatively narrow form, together with means for drawing the sheet material through the crumpler means.

A further object of the invention is to provide a mechanism of the character described in which the sheet-like material is drawn through the crumpler means by intermeshing gear means, and into relatively narrow strip or rope-like form, with said gear means coining or intermittently compressing the strip of crumpled sheet material.

A further object of the invention is to provide a novel mechanism for taking sheet-like material from a roll thereof, crumpling the sheet-like material into an elongated continuous strip or rope, and coiling the strip of material into permanent irregular spiral-like form, so that such coiled strip may be utilized as effective dunnage, for packing articles in shipping containers or the like.

A further object of the invention is to provide a novel mechanism for taking a plurality of webs of sheet-like materials and combining and forming the plurality of webs into an integral highly resilient dunnage product of tubular-like construction.

A still further object of the invention is to provide a mechanism for making cushioning dunnage and which utilizes sheet-like stock material for producing the dunnage with such sheet-like stock material being able to be stored in compact, dense condition, requiring relatively little cubic feet for storage, and which stock material is expanded many times over in the formation of the latter into a dunnage product, with a relatively simple mechanism which can be effectively utilized at the point of packing operations for efficient transmittal of the dunnage product directly into the containers being packed.

A further object of the invention is to provide a novel method of producing dunnage from sheet-like material such as paper.

A still further object of the invention is to provide a novel dunnage product having increased resiliency, and formed economically from sheet-like material, such as paper.

Other objects and advantages of the invention will be apparent from the following description taken in conjunction with the accompanying drawings wherein:

FIG. 5 is a generally diagrammatic perspective illustration of a dunnage producing mechanism illustrating a preferred embodiment thereof, and one utilizing miter bevel gears for drawing the sheet material through crumpler means, to form the resultant relatively narrow strip or rope of material into coiled or spiral form;

FIG. 6 is a top plan, diagrammatic illustration of the mechanism illustrated in FIG. 5;

FIG. 7 is a reduced size, fragmentary, perspective view of the mechanism illustrated in FIGS. 5 and 6, and illustrating a kinker mechanism coacting therewith, for preventing the strip of dunnage from being coiled into symmetrical or regular helical form, so as to reduce the density of the dunnage;

FIG. 8 is an elevational view of a section of the dunnage formed by the mechanism of FIGS. 5 through 7;

FIG. 9 is a sectional view taken along the plane of line 9—9 of FIG. 8;

FIG. 9A is a fragmentary, enlarged elevational view of a section of the dunnage of FIG. 8 showing the generally corrugated configuration thereof;

FIG. 10 is a fragmentary elevational, generally diagrammatic view illustrating a mechanism adapted for use with the dunnage mechanism of FIGS. 5 and 6 for producing predetermined weights of a quantity or slug (as they will be hereinafter called) of the dunnage material;

FIG. 11 is a diagrammatic, sectional view of a shipping container with an article packed therein with a quantity of the dunnage material illustrated in FIG. 8;

FIG. 12 is a fragmentary elevational view generally similar to FIG. 1 but illustrating another embodiment of the invention, and one utilizing spur gear means for drawing the sheet-like material through the crumpler mechanism, to produce a strip or rope of coined or intermittently compressed dunnage;

FIG. 13 is a fragmentary side elevational view of the FIG. 12 mechanism;

FIG. 14 is an enlarged top plan view of a section of the dunnage produced by the mechanism of FIGS. 12 and 13;

FIG. 15 is a side elevational view of the dunnage of FIG. 14;

FIG. 16 is a top plan view of a piece of dunnage produced in a dunnage mechanism generally similar to that of FIGS. 12 and 13 but wherein helical gears are utilized instead of spur gears, for drawing the sheet-like material through the crumpler and to coin the strip of dunnage;

FIG. 17 is a fragmentary, enlarged diagrammatic illustration of another embodiment of dunnage producing mechanism utilizing a belt operating on a spiral-like rod or mandrel, for forming a strip or rope of sheet-like material, which has been previously formed into strip or rope form by a crumpler or folder means, into a coiled strip or rope of dunnage;

FIG. 18 is a reduced size, top plan view of the mechanism illustrated in FIG. 17;

FIG. 19 is a side elevational view of the FIG. 18 mechanism;

FIG. 20 is an enlarged, perspective, fragmentary view of a piece of the sheet-like material as folded into strip-like or rope-like form by the crumpler or folder means of the FIG. 17 mechanism;

FIG. 21 is an enlarged, fragmentary, illustration of a section of the coiled dunnage as formed by the spiral mandrel and coacting belt of the FIG. 17 mechanism;

FIG. 22 is a reduced size, generally diagrammatic illustration of the belt utilized in the FIGS. 17–19 mechanism and illustrating the full twist formed in the belt for effective coaction with the spiral mandrel for producing the coiled configuration of dunnage;

FIG. 23 is a partially broken front elevation of a further embodiment of dunnage producing mechanism and one utilizing a plurality of webs of sheet-like material for forming a resilient tubular-like dunnage product of low density;

FIG. 24 is a partially broken side elevational view of the FIG. 23 embodiment;

FIG. 31 is a diagrammatic top plan view of the geared cutter mechanism of the FIGS. 23 and 24 machine, illustrating the cutting geometrics thereof.

Figure 1:
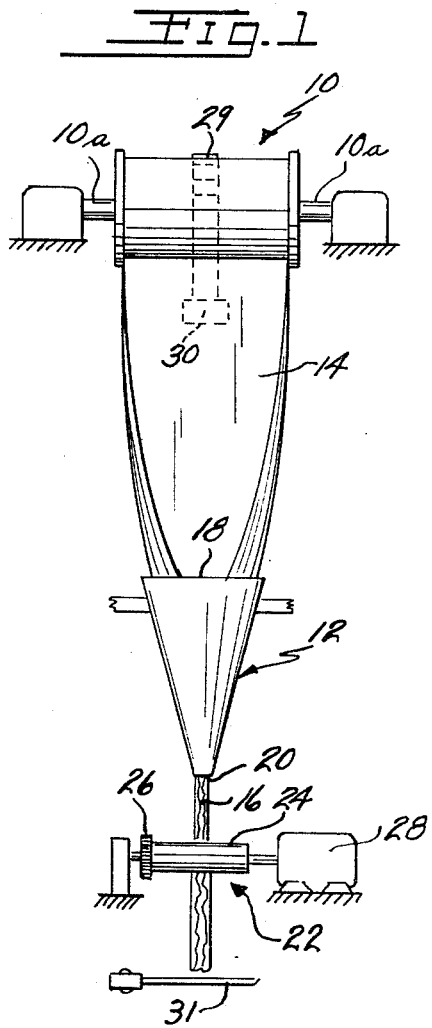
FIG. 1 is a diagrammatic front elevational view showing one embodiment of the invention with the sheet-like material being drawn through crumpler means in the form of a funnel-like mechanism, to form an elongated crumpled strip or rope of material for dunnage.

Referring now again to the drawings, FIG. 1 illustrates a roll 10 of sheet-like material 14 supported on trunnions 10a with a crumpler means 12 being preferably disposed in generally vertical downwardly spaced relation to the roll 10, and through which the sheet-like material 14 is adapted to move to form such sheet-like material into a relative narrow continuous strip or rope 16. A suitable sheet-like material has been found to be kraft paper having a density of 47.5 pounds per cubic foot. It will be understood however that other types of papers and other sheet-like materials would also be satisfactory.

The crumpler mechanism 12, in the embodiment illustrated, comprises a funnel-like device having a widened mouth portion 18 and a relatively narrow discharge end portion 20, thereby causing a gathering of the sheet-like material 14 as it comes off the roll and formation of such material into a relatively narrow strip or rope as it exits from the discharge end 20.

Means 22 may be provided for pulling the sheet-like material through the crumpler 12, and in the embodiment illustrated such means comprises a pair of rotatable rolls 24, 24a (such as rubber rollers) which may be drivingly connected to one another by means of gearing 26 at the ends thereof, and with one of said rolls (e.g. 24) being operatively coupled to a preferably variable speed, power unit 28, such as an electric motor, for rotating the rolls.

Figure 3:
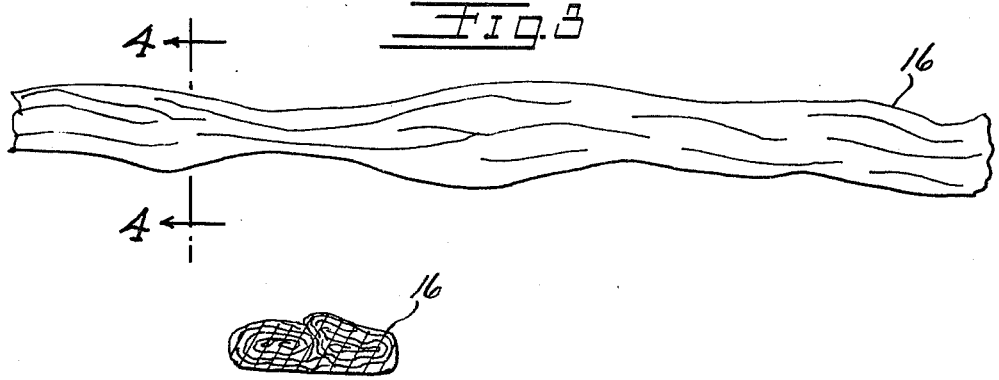
FIG. 3 is an enlarged top plan view of a section of the dunnage strip as formed by the mechanism of FIGS. 1 and 2.
Figure 4:
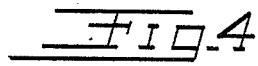
FIG. 4 is an enlarged sectional view of the dunnage strip taken generally along the plane of line 4—4 of FIG. 3, looking in the direction of the arrows.

It will be seen that upon energization of the motor 28, the rolls 24, 24a are driven to cause drawing of the sheet material through the crumpler 12. The outer surfaces of the rolls 24, 24a may be serrated, especially if they are formed of a material of low coefficient of friction, so as to increase the frictional coaction with the strip emitting from the discharge end 20 of the crumpler. A braking device comprising in the embodiment illustrated a strip of material 29 anchored as at 29a and coacting in frictional engagement with roll 10, may be provided to prevent overrunning of the roll. As will be seen weight 30 attached to strip 29, maintains the frictional coaction between the roll 10 and strip 29. As can be best seen in FIG. 2 as the relatively narrow rope or strip 16 of material passes through or is drawn between the rolls 24, 24a, such rope or strip is preferably reduced in thickness and may increase slightly in width. However, it will be understood that the strip of material after it passes between the rolls 24, 24a still has resiliency thereto due to the multitude of crumpled folds of material (FIGURE 4) and thus is not in a totally flattened and nonresilient condition. Preferably the spacing between rolls 24, 24a is adjustable so that the degree of flattening of the strip 16 can be varied. As can be seen from FIGS. 3 and 4, the finished generally flattened strip of dunnage material is of generally irregular configuration and is formed of piles or folds of the sheet material 14 as it is crumpled together by the crumple mechanism 12.

A cutter mechanism 31 of any suitable type may be provided for cutting the strip of dunnage material after it is formed by crumpler 12 and rolls 24, 24a, into suitable length sections for use as dunnage. Such cutter mechanism may comprise a conventional pivotal knife which may be either manually or power operated, and preferably is under the selective control of the operator. The dunnage strip sections may be of any desired length, and may be fed from the dunnage producing mechanism directly into the shipping container or the like in which articles are being packed, or such dunnage strip may be precut into predetermined length sections, and then placed in the shipping container in mass.

Referring now to FIGS. 5 and 6 which illustrate a preferred embodiment of the dunnage producing mechanism, such mechanism may comprise a support 34 for mounting a roll 10 of the sheet-like material 14, with such support 34 being preferably adjustable with respect to the platform 36, upon which the support may be mounted and preferably being adapted to accommodate a variety of roll widths. The crumpler means 38 of the FIG. 5 mechanism may comprise a funnel-like arrangement somewhat similar to that in the first embodiment having a widened mouth and a relatively narrow discharge nozzle portion 39 and with such sheet-like material being adapted to be pulled through such crumpler means by coacting bevel gear mechanism 40 which may be rotatively mounted on platform 36. In the embodiment illustrated, the bevel gear mechanism is miter gearing and the axis of the nozzle 39 is disposed at an angle of approximately 37½ degrees with respect to the horizontal. One of the bevel gears (e.g. 40a) may be drivingly coupled to a geared speed reducer 42 as by means of belt and pulley mechanism 44, which in turn may be coupled to a power means, such as a preferably variable speed electric motor 46. The other miter gear 40b is adapted to coact in meshing relation with gear 40a. Gears 40a, 40b are preferably adjustably mounted so that the degree of meshing can be selectively varied, and as by means of nuts 48 coacting in threaded relation with threaded portions of associated shafts 50 rotatably mounting the respective gear 40a or 40b. In other words, each gear is preferably adjustable in an axial direction, so as to vary the meshing relation between gears 40a, 40b.

The sheet-like material 14 is adapted to be pulled from the roll 10 thereof through the crumpler 38 by the coacting gears 40a, 40b, and as it passes between the rotating gears, the strip is coined or formed by the teeth of the gears as diagrammatically illustrated at 52 in FIG. 8. Moreover passage of the strip of material between the bevel gears causes the strip to be coiled as it passes through the gears so that it takes the form of spiral springlike loops 54 which loops have considerable resiliency and thus afford an extremely effective type of packing for use in shipping containers and the like.

The crumpler means 38 is preferably adjustably mounted for generally horizontal movement with respect to the gear mechanism so that the discharge end of the nozzle can be moved toward and away from the meshing gears for varying the "overshoot" of the strip or rope of crumpled sheet material emitting from the nozzle. Speaking generally, the closer the nozzle is moved in a forward direction toward the center of engagement of the miter gears, the greater the "overshoot" of the crumpled strip with respect to the gears, and the less of the material of the crumpled rope or strip that actually passes between the teeth of the coacting gears (some of the material passing downwardly exteriorly of the teeth of the gears). Accordingly, the greater the "overshoot," the looser the coils of the spiral-like dunnage product. Moreover, varying the nozzle diameter will also vary the dunnage product, with a larger diameter nozzle generally producing a dunnage product having looser coils or, in other words, dunnage having less coils per unit length as compared to a smaller diameter nozzle. Nozzle diameters of between ⅜" to ½" in increments of ¹⁄₁₆" have been tried and found to operate satisfactorily using six-inch wide, thirty-pound kraft paper, with miter gears possessing a pitch diameter of 1.5 inches.

Figure 25:
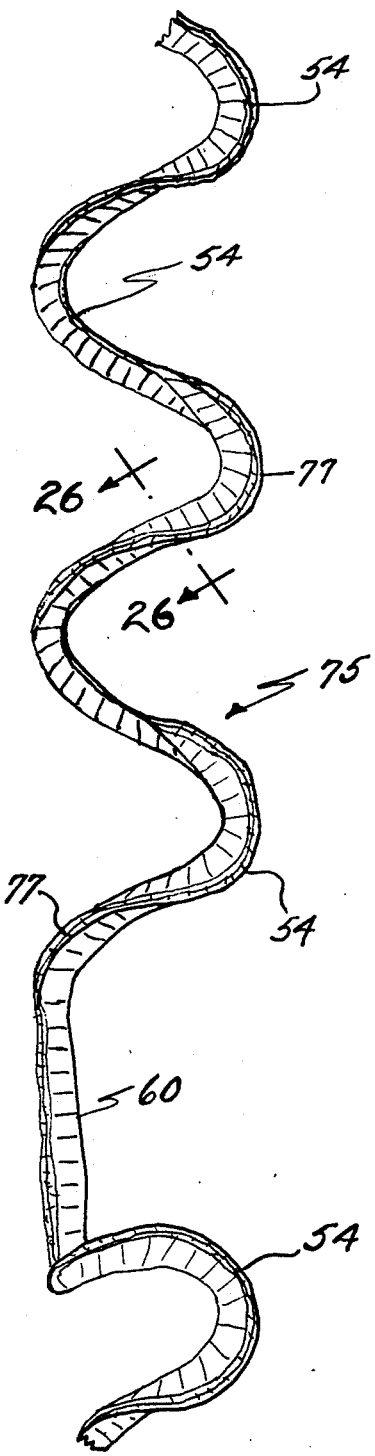
FIG. 25 is an elevational view of a section of dunnage produced by the dunnage producing mechanism of for instance FIGS. 5–7, and wherein the formed coils are not as tight as those of the FIG. 8 dunnage, and the strip or rope of paper material is not compressed to the extent of that of the FIG. 8 dunnage.
Figure 26:
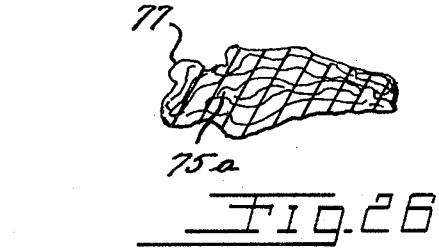
FIG. 26 is a sectional view taken generally along the plane of line 26—26 of FIG. 25.

Varying the meshing relation between the gears from, for instance, a tight meshing relation to a loose meshing relation also will vary the dunnage product, with a tight gear mesh producing a dunnage product having tighter coils than a dunnage product produced on a loose gear mesh. It will be understood, of course, that in any event there has to be sufficient play between the gears to prevent binding of the latter as the rope of crumpled sheet material passes between the teeth thereof. Gear teeth overlap of approximately ¹⁄₃₂ of an inch may be considered a generally loose gear mesh, while a tooth overlap of approximately ³⁄₃₂ of an inch may be considered a generally tight gear mesh, utilizing the stock sheet material and miter gears aforementioned. FIGS. 25 and 26 illustrate a less dense dunnage product produced with looser coils than that of the FIG. 8 dunnage, and with a loose mesh relation of the gears, and relatively great overshoot for the mechanism as above described.

Since the strip 55 of material exits in coil or spiral form as it passes between the gears, a shielding means 56 is preferably provided in partially encircling relation to the underside of the gears and through which the coiled strip of material passes, so as to prevent the spiral strip from passing back upwardly into the rotating gears after exiting therefrom. It will be seen that if a coiled strip coming between the gears attempts to move upwardly it will engage the downwardly sloping surface of the half conical-like shield 56, and be urged downwardly away from the gears, thus preventing movement of the coiled strip back into the coacting gears.

Disposed below the shield means 56 may be a cutter mechanism 58 of any suitable type, for cutting the strip of coiled dunnage into lengths, if desired, for use as dunnage.

The strip of material being emitted from between the miter gears 40a, 49b, if it is in symmetrical or regular helical form so that it is collapsible and expansible much like a spring, will not provide optimum dunnage, as if the strip of material is instead in irregular coil or spiral form. In order to prevent symmetrical collapsing of the spiral dunnage, there is preferably a kink or spiral malformation 60 (FIG. 8) formed in the strip at random locations along its length, so that upon collapsing of the section of dunnage formed from such strip material, the dunnage will not completely collapse into symmetrical coiled form, but instead will still be disposed in irregular or tangled form. A mass of the dunnage material in irregular or tangled condition is illustrated in FIG. 11 in a shipping container 62 and surrounding an article A and it will be understood that while certain of the coils or spirals 54 may collapse into symmetrical coiled form during retraction or compression of the dunnage section, that the malformed portion 60 which may extend in generally vertical planes as opposed to the generally obliquely horizontal planes of extension of the spirals, prevent complete symmetrical collapsing into coiled form, and result in off-setting of the spiral sections from axial alignment with one another during axial compression of the dunnage strip, resulting in a tangled and highly resilient mass of dunnage. Thus it will be seen that the dunnage strip sections do not completely collapse but form an irregular configuration for giving less density and greater resiliency to the dunnage mass.

Now, in order to insure that the corrugated or ribbed strip material being emitted from between the gears in coiled form will not be formed into regular coils or spirals but will be provided with the aforementioned kinks or malformed portions 60, a means may be provided for interrupting the regular coil or spiral formation of the dunnage strip produced from its passage through the bevel gears, and causing the strip of material to be kinked or reversed in its spiral formation, thus interrupting the regular coil configuration being formed by the gears. It will be understood that as the strip of material is emitted in generally spiral form from between the gears 40a, 40b, the lower end of the spiral strip is moving in a generally rotary path about the lengthwise axis of the spiral. Accordingly, in order to interrupt the formation of a regular spiral or helical configuration, a resistance to this rotary movement of the lower portion of the spiral strip results in the formation of the malformed or kinked portions 60 of the dunnage strip.

This means for applying a resistance or interruption of the regular spiral production of the strip in the embodiment illustrated in FIG. 7, comprises a cylindrical-like housing 66 open at the top thereof and encompassing the shielding means 56 and which has an openable bottom wall 66a pivoted as at 67 to the housing so that as the strip of material coils down from the gears, the frictional engagement thereof with bottom wall 66a will cause a reversal of the regular coiling formed by the gears, thus making the malformed portions 60 in the spiral strip. The bottom wall may be counterbalanced as at 70, so that upon relatively slight predetermined pressure due to engagement of the spiral dunnage with the door, the door will tip downwardly about its pivot and permit the coiled material to be emitted from the housing 56. Housing 56 is preferably readily detachable from coaction with the dunnage mechanism for ease in assembling and removal.

A work bench 74 (FIG. 5) may serve as the kink producing means instead of housing 56, since engagement of the lower rotating end of the spiral strip with the top surface of of the work bench will produce a resistance or drag on the spiraling movement of the strip resulting in malformed or kink portions 60. Also stuffing or handling of the dunnage into a container for packing while the machine is running will also produce the kinked or malformed portions of the dunnage product.

It will be understood that the number of coils or spirals in a predetermined length section of the coiled dunnage before kinking and reversal thereof is not necessarily uniform, since it depends on how much resistance is provided to the turning or rotation of the lower end of the strip, as it passes down between the bevel gears. Other factors appear to be the width of the strip or rope of material as it comes from the crumpler mechanism and the size of the bevel gears, so that there are certain variables which can enter into the formation of the dunnage to affect its ultimate coil configuration. Miter gears with 1.5 inches to 2 inches pitch diameter and having respectively 18 and 20 teeth have been used to produce highly effective dunnage. As can be seen in FIG. 11 when the dunnage is compressed it does not collapse into regular coil form due to the fact that the coils are not all symmetrically formed into a symmetrical helix, but due to the irregular configuration of the dunnage sections due to the malformed portions or sections 60, the dunnage resists collapsing and becomes a resilient mass when packed in a container, which gives good cushioning to articles packed in the dunnage.

From FIG. 9 it can be seen from the cross section of the dunnage strip that the latter is formed of layers or folds of the sheet-like material or paper as compressed between the teeth of the gears, with the teeth having coined the dunnage strip into generally wave-like or corrugated form in a direction generally crosswise of the strip, and as shown in FIG. 9A.

FIGS. 25 and 26 illustrate a coiled form of dunnage produced with relatively loose coils, by having a relatively loose mesh relation between the coining gears and by having a relatively great "overshoot" of the crumpled rope or strip from the crumpler, into the gears. In other words, the exit end of the nozzle 39 is relatively close to the center of the engagement between the gears (say for instance, 1/8" back from the center of engagement) and the gear teeth have an overlap of approximately 1/32 of an inch for a loose mesh relation. Such a dunnage product 75 is of low density, with the intermediate layers 75a of material being loosely formed in the interior of the outer layer, giving the product low density and high resiliency. The increased "overshoot" produces an enlarged end portion 77 (in a direction transverse of the product) which tapers or converges toward the other end. Enlarged or unsqueezed portion 77 is formed due to the fact that with a relatively great overshoot and a loose mesh relation, the forward edge of the rope or strip from the crumpler passes outside or forwardly of the gear teeth and thus is not coined or squeezed, while the tapered portion passes between the teeth and is coined or squeezed. However, the loose mesh of the gears coins the rop or strip materially less than that of the FIG. 8 dunnage product.

FIG. 10 discloses a mechanism for weighing out a predetermined weight or slug (as it is hereinafter referred to) of the dunnage material, as produced by the dunnage mechanism of FIGS. 5 and 6. This mechanism would be usually used where repetitive packaging requires the same amount of dunnage. Such mechanism may comprise a metering housing 78 open at the top thereof, and which encloses the gears 40a, 40b and the aforementioned shield 56, and into which the dunnage strip as it comes down from between the gears, is adapted to drop. The bottom wall 78a of the housing may be pivoted to the housing for opening and closing movements and may have a counterweight mechanism 80 thereon so that after a predetermined weight of the strip dunnage has gathered in the housing, the bottom wall is forced open and the slug of dunnage material passes downwardly onto a supporting surface or work table 82. The bottom wall then recloses due to the removal of the weight of the dunnage therefrom, and the strip may be cut by means of the associated cutter means 58. Meanwhile, another slug of dunnage is being formed in the housing. Kinking or malformation of the dunnage occurs in housing 78 in the manner aforedescribed.

The interior of the housing is preferably completely smooth so that the slug of dunnage has nothing to catch on in the housing 78, so that when the bottom door pivots downwardly the slug of dunnage readily falls downwardly out of the housing. The counterblance may comprise a hollow tube 80a having ball weights (not shown) rollingly mounted therein to increase the sensitivity of the wall 78a and provide for quick dumping and more accurate weighing. In the closed condition of wall 78a, the weighted end of tube 80a may be disposed slightly below the horizontal, with a stop being provided to limit the upward pivotal movement of the counterweight and associated downward pivotal movement of the door 78a.

Figure 2:
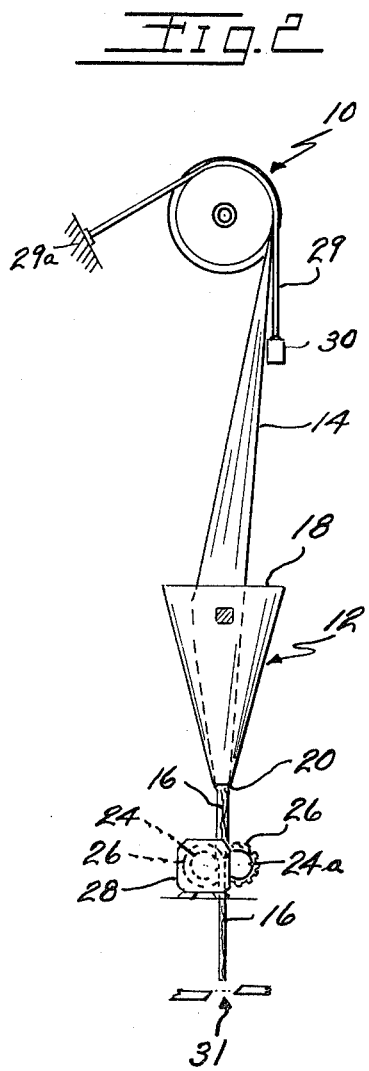
FIG. 2 is a side elevational view of the FIG. 1 mechanism.

Referring to FIGS. 12 and 13 there is shown a dunnage mechanism which is generally similar to that of the type illustrated in FIGS. 1 and 2, except that the mechanism for pulling the strip of crumpled sheet-like material through the crumpler comprises meshing gears 84, which in the embodiment illustrated are spur gears. These spur gears are rotatively mounted with respect to supporting means 86 and may be power driven as means of a preferably variable speed electric motor 88. The dunnage strip passes through the spur gears and is coined by the teeth of the gears, and the strip comes out as an elongated generally linear strip of material. Such dunnage material due in part of its corrugated configuration 90 (FIGS. 14 and 15) does possess considerable cushioning effect, and may be cut into suitable sections for providing dunnage for use in packing, and as shown for instance in FIG. 11. It will be understood, of course, that the dunnage strip can be fed in one continuous strip into a packing or shipping carton without cutting it into predetermined length sections.

The dunnage section illustrated in FIG. 16 is similar to the dunnage of FIG. 14, except that the gears which coin the strip of sheet-like material and pull it through the crumpler are helical gears, thereby giving the strip 92 of dunnage a corrugated configuration at oblique angles with respect to the lengthwise axis of the strip. Here again such dunnage possesses considerable cushioning effect. However, it does not possess the cushioning effect possessed by the spirally formed dunnage produced by the FIGS. 5 to 7 mechanism.

Referring now to FIG. 17 there is shown another embodiment of a dunnage producing mechanism. In this embodiment the crumpler mechanism takes the form of a framework 96 which has a plurality of converging slats 96a, 96b mounted in a fabricated support 98, with the slats being offset with respect to one another at their distal ends and in generally horizontal directions, and being generally aligned at their proximate ends 100, so as the sheet-like material 14 coming from the vertically oriented rotatable roll 102 (FIG. 19) is pulled through the slat framework, the sheet-like material is automatically folded or creased into a generally flat elongated relatively narrow strip 104 of material, such as shown for instance in FIG. 20. In this connection it will be seen that the sheet-like material 14 coming from the roll 102 first passes around the exterior of generally vertical rib 106 and then passes behind generally vertically arcuate rib 108 prior to passing through vertical slot 110 (FIG. 17) in the support 98 and into coaction with creasing slats 96a, 96b. Rib 108 tensions the web 14 of paper into a generally vertically concave configuration which aids in the folding thereof into strip form 104 by crumpler mechanism 96. A friction braking mechanism 112 anchored as at 112a and 112b maintains a tension on the material of roll 102 and prevents overrunning thereof.

The relatively narrow strip of sheet-like material 104 is then passed between a pair of coacting rollers 114, 114a which are geared together, as at 115, and with one (e.g. 114) of the rollers being power driven, so as to actually pull the strip through the crumpler or folding mechanism 96. The strip may then pass over a rotatable roller 116. and is fed onto the underside of a belt 118 which coacts with a spiral or helical mandrel 120, to draw the strip of material around the helix in compressed relation, thus forming the linear strip 104 of material into a permanent helical or spiral form, which helical form, as shown in FIG. 21, has a considerable amount of resilency both axially and transversely thereof.

The belt 118 winds around the helical mandrel 120, as at 124 (FIG. 17) and which is set at approximately a 45° angle in a horizontal plane, with respect to the axis of the roller 116, and then passes around a large crown-faced pulley or drum 126 which is power driven as by means of an electric motor 128 and coacting geared speed reduction unit 130. The belt 118 then extends forwardly to pass around crown-faced pulley 132 and then beneath the pulley 132 to coact with roller 116 in drawing the strip 104 of material coming from crumpler 96, around the spiral mandrel 120. Roller 116 and pulley 132 may be geared together as at 133.

A chain and sprocket drive mechanism 134 may be used to drive a pulley 136 which is connected as by means of a belt 138 to pulley 140 (FIG. 18) coupled to one (e.g. 114) of the drawing rollers which are geared together as aforementioned. Coacting with the belt 118 there may be an idler arm and roller means 142 which places a predetermined tension on the belt to maintain the belt in tensioned relationship as it passes around the pulleys 126 and 132. As can be best seen in FIG. 22, the belt 118 is formed with a full 360 degree twist, for enabling the belt to coact with the spiral mandrel 120, in a manner to permit the belt to travel flat without twist as it moves from the top of 126 to top of 132. A preferably rotatable guide means 144 coacting with the outer edge of the belt 118 may also be provided for guiding the movement of the belt. The coiled dunnage as it exits from the outer end of mandrel 120 is rotating about its lengthwise axis, and curls about take-off and guide rod 148 which is sloped downwardly to direct the endless coil of dunnage along the take-off rod to a receptacle 150 or the like.

A cutter mechanism 152 may be provided, which in the embodiment illustrated comprises a shears-like means 154 through which the strip of coiled dunnage must pass, in order to coact with the take-off rod 148. One of the blades of the shear mechanism may be coupled to a fluid powered motor unit 156 which may be of the double-acting cylinder type, and which may be selectively controlled by an operator to cut the strip of dunnage as it is emitting from the mandrel 120 and coacting belt 118. Operation of the cutter mechanism will cut the coiled strip of dunnage into selected lengths for use as loose packing material. The operator may preset the machine to automatically cut off desired lengths. It will be understood that the distal end of the coiled dunnage comming off the take-off rod 148 should be free, so as to prevent uncoiling forces from being applied thereto.

Referring now to FIGS. 23 and 24, there is shown another embodiment of dunnage-producing mechanism which is adapted in the embodiment illustrated, to utilize a plurality of webs of a sheet-like material and to combine and form such plurality of webs into an integral, resilient, tubular-like construction of cushioning dunnage. It will be understood that only one web of stock material could also be used to form a tubular-like dunnage product.

Such mechanism as illustrated may comprise a base support 160 having rack structure 162 mounted thereon, which rack structure is adapted to support a plurality of spaced rolls 164, 164a of the sheet or web-like material. As illustrated, the lower roll 164 is preferably of a lesser width material as compared to the upper roll 164a.

The rolls 164, 164a are rotatably mounted on rack structure 162, and suitable braking mechanism (not shown) is preferably provided coacting with the rolls to prevent over-running of the latter. The web of sheet material from the respective roll is adapted to be drawn downwardly into the crumpler mechanism 169 where it is formed into a generally loose tubular-like configuration after which it is passed through gear means 170 which stitches or coins together at least the free lengthwise edges 171, 171a of the tubular-shaped sheet stock emitting from the crumpler 169, to thus maintain the multi-web dunnage product in integral assembled tubular-like condition.

The crumpler 169 in the embodiment illustrated comprises a funnel-like upper portion 172 which gathers in the plurality of webs coming from the rolls 164, 164a, and a lower, sleeve portion 174 which forms such gathered webs of material into a generally tubular configuration, and guides the latter into the gear means 170. The sleeve portion 174 has cutaway portions 174a at its lower end for providing clearance for the stitcher or coining gear means 170 (FIG. 24) which are adapted to draw the multi-web tubular assembly down through the crumpler, and to stitch the opposite sides thereof. As can be best seen in FIGURE 24, the gears are so positioned with respect to the sleeve portion 174 that they will engage just opposite edges of the multi-web assembly as it passes from the sleeve portion into the teeth or bite of the gear means.

In the embodiment illustrated, two sets of coacting spur gears 170 are illustrated, with one gear of each set being power driven as by means of the motor 178 and associated belt drive 180 coacting with a pulley 182 fixed to a shaft 184 to which one (186) of the gears of each set of gear means 170 is keyed or otherwise secured. The gears of each set are preferably adjustable with respect to one another so as to provide for varying the mesh clearance.

Extending upwardly from the crumpler 169 and more particularly the funnel portion 172 of the crumpler 169, may be a bar support 188 to which is preferably adjustably secured as at 189, a gathering ring 190, oriented in overlying generally centered relationship to the funnel portion 172, for the purpose of gathering and guiding the webs from the upper stock roll 164a and the lower stock roll 164, and guiding them into the funnel portion 172. The web from the lower roll 164 passes interiorly of ring 190 while the web from upper roll 164a passes exteriorly of the ring. Extending upwardly from the distal side of the gathering ring 190 may be a belly pusher rod 192 (FIG. 24) which is adapted to engage the front face of the web of material from the upper stock roll 164a, and helps to guide the web into the funnel portion in the tubular forming operation. Rod 192 preferably has a rounded upper end 194 for preventing tearing of the web of stock material by the rod during engagement thereof with the web. As can be best seen in FIG. 24, the web of material from the upper stock roll is adapted to pass rearwardly of the rod 192 and down into the funnel to be formed into generally tubular condition, after which the opposite lengthwise edges of the formed sleeve of material from both the upper and lower stock rolls are stitched by the gear means 170.

Disposed above the guide ring 190 may be a forming ring 198, also projecting outwardly from the support 188 into overlying relationship with respect to the funnel portion 172, and as can be seen in FIG. 24 generally centered thereabove. Forming ring 198 is adapted to engage the front surface of the web of lower stock roll 164 and to aid in forming it into generally tubular shape for entry into the crumpler. Extending downwardly through the crumpler mechanism may be a guide rod 200 which like-wise may be supported on support 188, and which passes down through the guide ring 190, through the crumpler 169, to terminate approximately at the support 160. Such guide rod aids in guiding the plurality of webs from the upper and lower stock rolls into a tubular-like dunnage product and in stabilizing and centering the tubular stock material as it passes through the gear means 170.

The tubular-like dunnage product 203 emitting from between the gear means passes downwardly through an opening 202 (FIG. 23) in the support 160, and between a cutter mecahnism 204 which may be selectively operated to cut the dunnage product into selected lengths.

Figure 28:
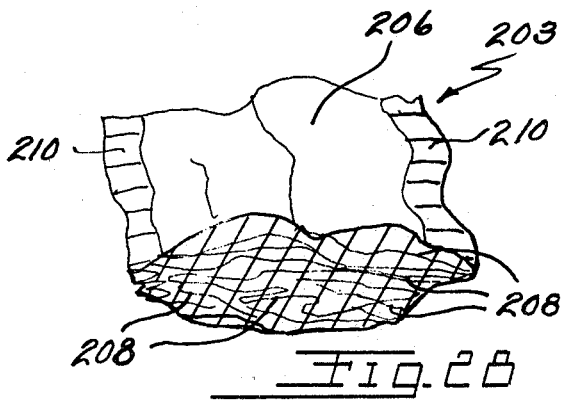
FIG. 28 is a sectional view taken generally along the plane of line 28—28 of FIG. 27.
Figure 27:
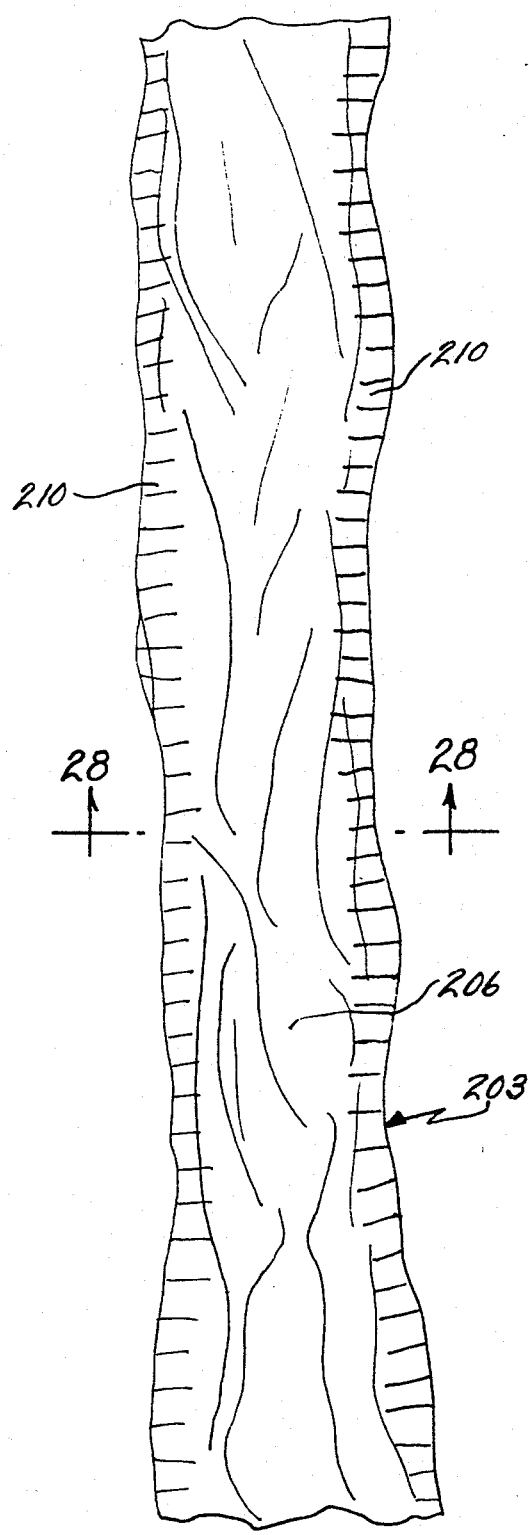
FIG. 27 is an elevational view of a section of tubular-like dunnage produced by the mechanism of FIGS. 23 and 24.

Referring now to FIGS. 27 and 28 it will be seen that the dunnage product is of generally irregular tubular configuration comprising an outer layer or envelope 206 formed from the web of material from upper roll 164, and generally loosely interleaved inner filler layers 208 formed primarily from the lower roll 164, all of which is stitched along opposing lengthwise sides 210 of the product by the gear means 170. Such a dunnage product has low density and high resilience, and results in a dunnage product possessing good cushioning properties.

Figure 30:
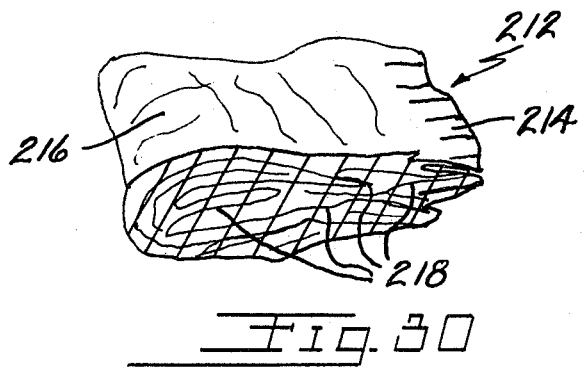
FIG. 30 is a sectional view taken generally along the plane of line 30—30 of FIG. 29.
Figure 29:
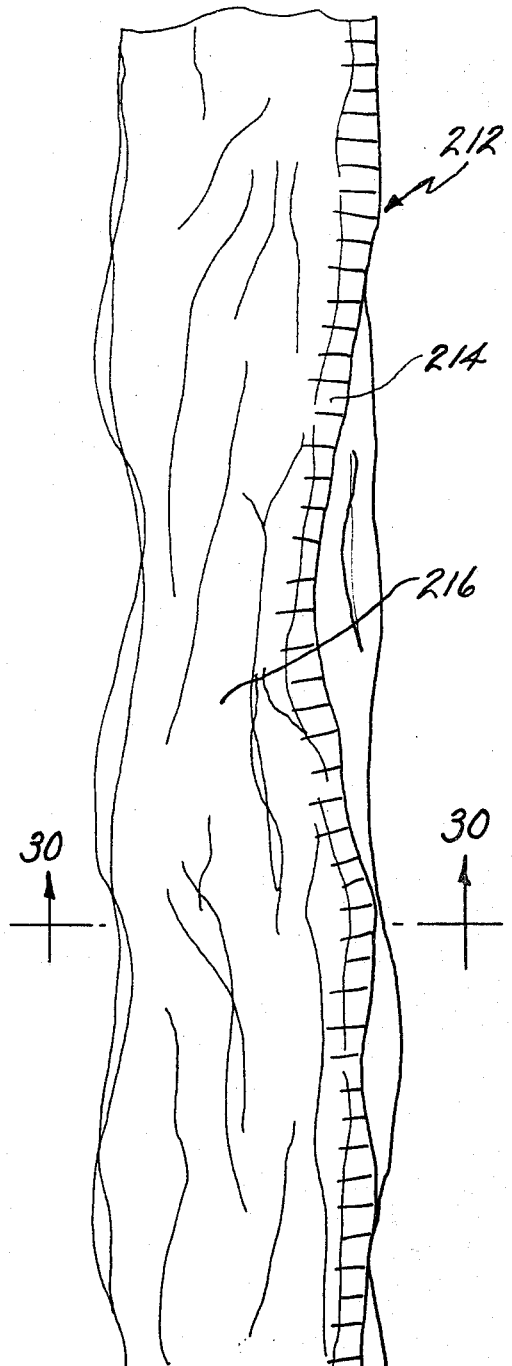
FIG. 29 is an elevational view of a modified form of tubular-like dunnage, which is coined only on one lengthwise edge thereof instead of on both lengthwise edges as in the FIG. 27 embodiment.

FIGS. 29 and 30 disclose a dunnage product 212 produced by a machine generally similar to that of FIGS. 23 and 24, except utilizing only one set of gear means so that the tubular-like dunnage is stitched or coined along only the open edges (as at 214) with the opposite edge not being coined. This product likewise comprises an outer envelope 216 and loosely interleaved inner layers 218, and giving good cushioning properties.

It has been found that the outer envelope of the tubular-like dunnage product may be expeditiously formed of a relatively high strength sheet material, such as for instance kraft paper, while the inner filler layers provided by roll 164 may be formed of a cheaper and less high strength material, such as for instance newsprint paper. Also, a dunnage product formed from an outer envelope of a softer sheet material, such as for instance kraft dry waxed paper, with the inner filler material formed from the stiffer standard kraft thirty pound paper, has been found to provide an expeditious cushioning dunnage product having dust free and soft exterior characteristics, while still possessing internal stiffness for relatively high resiliency.

The aforementioned cutter mecahnism 204 may comprise shear blades 220 including arm portions 221 (FIG. 31) which are pivoted to one another as at 222 and are pivotally mounted as at 223, to a respective gear 224, 226 disposed in meshing relation, and with a handle mechanism 228 (FIG. 24) being provided for rotating gear 224, thereby causing rotation of gear 226 and opening and closing movements of the shear blades. As can be seen from FIG. 31, upon rotation of the handle of the cutter mechanism so as to cause rotary movement of the meshed gears in the direction of the full line arrows, the pivotal axes 223 of the arm portions 221 of the cutter to the respective gear moves for instance from position 1 to postion 2 wherein the blades 220 are spaced apart as illustrated by the dashed lines, then to position 3 wherein the blades commence to close as shown by the dotted lines, then to position 4 wherein the blades are closed a greater amount as illustrated by the dot-dashed lines, with the blades being extended forwardly to their forwardmost position, then back to position 1 wherein the blades are retracted and close, to cause cutting of the dunnage. Accordingly the dunnage is cut as the blades are being retracted, and severing of the tubular-like dunnage product is accomplished without tearing thereof.

From the foregoing discussion and accompanying drawings it will be seen that the invention provides a novel dunnage producing mechanism which includes means adapted to receive sheet-like material from a roll thereof and form or crumple it into an elongated relatively narrow strip or rope, together with means for drawing the strip through the crumpler means. The invention also provides a dunnage producing mechanism which forms the strip or rope into coiled or spiral-like configuration to give increased resiliency to the dunnage, thus improving the cushioning characteristics thereof in its use as loose packing material. Moreover, the invention provides a dunnage producing mechanism which forms a plurality of webs or sheet-like material into a tubular-like form of highly resilient, low density dunnage. The invention also provides a novel dunnage product which has increased resiliency over dunnage heretofore known, and which is formed from sheet-like material, such as ordinary Kraft paper, which may be stored in compact roll form prior to its formation into suitable dunnage and which may be fed directly from the dunnage producing mechanism into containers. The invention also provides a novel method for producing dunnage, and one which greatly simplifies the production of dunnage, resulting in economies in such production.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a mechanism for producing dunnage comprising crumpler means for receiving sheet-like material therein and operative to form it into an elongated relatively narrow strip, means for drawing sheet-like material through said crumpler means, and means coacting with said drawing means for forming the strip into helical coil-like form, said drawing means and associated coacting means comprising a pair of coacting bevel gear-like means having meshed toothed faces between which the strip is meant to pass with such gear means being operative to coin said strip and cause formation of the latter into said helical coil-like form, said gear means being rotatable about axes disposed in a common plane, means for driving said gear means for causing drawing of the strip of material through said crumpler means, said crumpler means comprising a reducing member having an inlet end and an exit end with the lengthwise axis of the latter member extending obliquely from said inlet end toward said exit end and toward said plane, with said exit end being disposed in predetermined relation to said toothed faces for feeding the strip between said faces.

2. A mechanism in accordance with claim 1 including means for rotatably mounting a roll of sheet-like material thereon, and means adapted for coaction with the roll of material for resisting rotation of the latter.

3. A mechanism in accordance with claim 1 including cutter means for cutting the elongated helically coiled strip into lengths.

4. A mechanism in accordance with claim 1 including means coacting with said drawing means downstream from the latter for periodically interrupting the formation of said strip into regular helical coil configuration and resulting in dunnage having portions of helical coil configuration alternated with malformed portions.

5. In a mechanism for producing dunnage comprising crumpler means adapted to receive sheet-like stock material therein and form it into elongated relatively narrow tubular-like form, means for drawing the sheet-like stock material through said crumpler means, means for rotatably mounting a roll of the sheet-like material thereon upstream from said crumpler means, said crumpler means comprising a funnel-like member having an inlet end and an exit end with the inlet end being wider than the exit end and being adapted to urge the sheet-like material into loosely crumpled tubular-like configuration upon actuation of said drawing means to move the sheet-like material through said crumpler means, forming means disposed upstream from said inlet end for laterally engaging the sheet-like material from one side thereof to concave the sheet-like material in a direction transversely thereof and thus urge and guide the sheet-like material toward generally tubular configuration prior to its entry into said funnel-like member, and said drawing means including stitching means for stitching the tubular product lengthwise thereof to thus provide for maintaining the product in said generally tubular-like form.

6. A mechanism in accordance with claim 5 including spaced means for rotatably mounting a plurality of rolls of sheet-like stock material thereon, said means for drawing sheet-like material through said crumpler means being adapted to draw the sheet-like material from all of said rolls concurrently through said crumpler means and form said sheet-like material into an integral tubular-like dunnage product.

7. A mechanism in accordance with claim 6 wherein said forming means includes vertically spaced generally horizontally oriented and axially aligned ring-like members, each of said ring-like members on its exterior periphery being engageable with a respective sheet of the stock material from the plurality of rolls for urging and guiding the respective sheet toward tubular configuration prior to entry thereof into said funnel-like member, said means for drawing sheet-like material through said crumpler means including spaced sets of meshing gears which are adapted to receive opposing lengthwise edge portions of the tubular-like assembly of sheet-like material therebetween and stitch both lengthwise edge portions by crimping the latter.

8. A mechanism in accordance with claim 1 including metering hopper means coacting with said dunnage producing mechanism for measuring by weight predetermined slugs of the dunnage, said metering hopper means including movable means for sensing the weight of a slug of dunnage material in said hopper means and automatically discharging the slug of dunnage from said hopper means when the weight reaches a predetermined figure, by movement of said movable means from an active slug supporting position to an inactive position, and means coacting with said movable means for automatically returning the latter to said active position after said discharge of the slug of dunnage material from said hopper means.

9. A mechanism in accordance with claim 8 wherein said metering hopper means comprises a generally vertically oriented housing into which the produced dunnage is adapted to pass from said drawing means, said housing having a pviotal wall on its lower end thereof forming said movable means, and means counterweighting said wall to prevent opening movement of said wall until a predetermined weight of dunnage is supported by said wall, said counterweighting means comprising said means coacting with said movable means and automatically causing movement of said wall toward closed position after a slug of said coiled strip dunnage moves downwardly past said wall.

10. A mechanism in accordance with claim 1 including means disposed adjacent said gear-like means downstream from the latter and coacting therewith for preventing the helically coiled strip of material from feeding back through the gear-like means after passing between the toothed faces of said gear-like means.

11. In a mechanism for producing dunnage comprising crumpler means having an inlet end and an exit end and adapted to receive sheet-like material therein and form it into an elongated relatively narrow strip, means for drawing sheet-like material through said crumpler means, and means coacting with said drawing means for forming the strip into helical coil-like form, said drawing means and associated coacting means comprising a pair of coacting bevel gears having meshed toothed faces between which the strip is adapted to pass, with said gears being adapted to coin said strip and cause formation of the latter into said helical coil-like form, said gears being rotatable about axes disposed in a generally horizontal plane, means for driving said gears for causing drawing of the strip of material through said crumpler means, said crumpler means comprising an elongated funnel-like member with the lengthwise axis of the latter extending obliquely downwardly from said inlet end toward said exit end and toward said plane, with said exit end being disposed at a level above the meshing area of said toothed faces for feeding the strip between said faces, and including means spaced from and disposed downstream from said gears for frictional engagement with said helically coiled strip after passage thereof through said gears, for preventing formation of said strip into regular coils, but instead causing said strip to kink and interrupt the regular helical coil configuration thereof as produced by said gears, due to the holding frictional coaction of the rotating coiled strip with said spaced means.

12. In a mechanism for producing dunnage comprising crumpler means having an inlet end and an exit end and adapted to receive sheet-like material therein and form it into an elongated relatively narrow strip, means for drawing sheet-like material through said crumpler means, means coacting with said drawing means for forming the strip into helical coil-like form, and also including means coacting with said drawing means downstream from the latter for periodically interrupting the formation of said strip into regular helical coil configuration and resulting in dunnage having portions of helical coil configuration alternated with malformed portions, said interrupting means comprising a generally vertically oriented housing into which said coiled strip rotationally moves after passing through said drawing means, a movable abutment on the lower end of said housing for closing the latter, and means for automatically moving said abutment from open back to closed condition upon passage of the coiled strip through said housing and past said abutment due to opening of said abutment upon predetermined pressure of said coiled strip against said abutment, the frictional coaction between said abutment and the coiled strip causing the interruption of the formation of said strip into regular helical coil configuration and the production of the malformed portions thereof.

13. A mechanism in accordance with claim 12 wherein said means for automatically moving said abutment includes a counterbalancing means on said abutment for causing said abutment to swing to open position upon predetermined engagement of the coiled strip with said abutment and to swing to closed position upon movement of the coiled strip from said housing past said abutment when the latter is open and cutter means for cutting the coiled strip into lengths.

14. In a mechanism for producing dunnage comprising crumpler means having an inlet end and an exit end and adapted for receiving sheet-like material therein and forming it into an elongated relatively narrow strip, means for drawing sheet-like material through said crumpler means, and means coacting with said drawing means for forming the strip into helical coil-like form, said means coacting with said drawing means for causing helical coiling of said strip comprising a mandrel having a helical-like exterior configuration thereon and a movable endless belt coacting with said mandrel with said belt being adapted to pass in engaged relation about said mandred with the strip of material from said crumpler means and to press the strip into helical coiled configuration, and wherein said crumpler means comprises a framework of staggered slot-like members converging toward said exit end and in a direction toward said drawing means, and which is adapted to fold the sheet-like material into generally flattened, relatively narrow strip-like form, said drawing means comprising opposed coacting rollers for pulling the sheet-like material through said framework, said endless belt being disposed downstream from said rollers and adapted to receive the strip from said rollers in engaged relation with the exterior underside of said belt and press the strip against said mandrel during movement of the belt and strip with respect to the mandrel, to form the strip into said helical coil-like form, and means coacting with said mandrel for guiding the coiled strip away from said mandrel.

15. A mechanism in accordance with claim 5 including spaced means for rotatably mounting a plurality of rolls of sheet-like material thereon, said means for drawing sheet-like material through said crumpler means being operable to draw the sheet-like material from all of said rolls concurrently through said crumpler means and form said sheet-like material into an integral tubular-like dunnage product, said forming means comprising spaced members urging and guiding the respective sheet toward a tubular configuration prior to entry thereof into said crumpler means whereby one of said sheets is disposed interiorly of the tubular-like configuration of the other of said sheets with the edges of the outer of said sheets of stock material being disposed in generally confronting engaged condition, said crumpler means being generally vertically oriented for substantially vertical movement of the sheet-like material therethrough, said crumpler means comprising an upper downwardly converging funnel-like portion and a lower cylindrical sleeve-like portion attached to said upper portion in axial alignment therewith for guiding the sheet-like material formed by said upper portion into tubular-like form, downwardly toward said stitching means, said drawing and stitching means comprising coacting gears disposed so as to overlap the plane of the interior periphery of the lower end of said sleeve-like portion for stitching engagement of said gears by coining of the tubular product lengthwise thereof along said confronting edges.

16. In a mechanism for producing dunnage comprising, crumpler means having an inlet end and an exit end and adapted to receive sheet-like material therein and form it into an elongated relatively narrow strip, means for drawing sheet-like material through said crumpler means, and means coacting with said drawing means for forming the strip into helical coil-like form, said drawing means and associated coacting means comprising a pair of coacting bevel gears having meshed toothed faces between which the strip is adapted to pass, with such gears being adapted to coin said strip and cause formation of the latter into said helical coil-like form, said gears being rotatable about axes disposed in a generally horizontal plane, means for driving said gears for causing drawing of the strip of material through said crumpler means, said crumpler means comprising an elongated funnel-like member with the lengthwise axis of the latter extending obliquely downwardly from said inlet end toward said exit end and toward said plane, with said exit end being disposed at a level above the meshing area of said toothed faces for feeding the strip between said faces, said lengthwise axis of said funnel-like member being disposed at an angle of approximately 37½ degrees with respect to the horizontal, means movably mounting said funnel-like member for generally horizontal movement toward and away from said toothed faces of said gears for selectively varying the distance between said exit end and said meshed gear faces, said bevel gears comprising miter gears, and means for selectively moving said gears with respect to one another for varying the meshing overlap between the teeth of said gears.

References Cited

UNITED STATES PATENTS

| | | | |
|---|---|---|---|
| 563,962 | 7/1896 | Hinde | 93—94 |
| 686,879 | 11/1901 | Arkell | 93—1 |
| 1,410,879 | 3/1922 | Bither | 93—1 |
| 1,616,836 | 2/1927 | Watts | 83—157 |
| 1,789,505 | 1/1931 | Uline | 83—79 X |
| 1,888,197 | 11/1932 | Hoeflich | 93—1 |
| 2,020,668 | 11/1935 | Wandel | 93—1 X |
| 2,107,748 | 2/1938 | Cohn | 93—1 |
| 2,499,463 | 3/1950 | Crary | 93—1 |
| 2,786,399 | 3/1957 | Mason | 93—1 |
| 2,873,965 | 2/1959 | Mitchell | 93—1 |
| 2,882,802 | 4/1959 | Walker | 93—1 |
| 2,924,154 | 2/1960 | Russell | 93—1 |
| 3,130,412 | 4/1964 | Fox | 93—1 X |
| 3,323,983 | 6/1967 | Palmer | 93—1 X |
| Re. 20,034 | 7/1936 | Ives | 156—591 X |
| 2,163,063 | 6/1939 | Romanoff | 156—592 |
| 3,220,056 | 11/1965 | Walton (I) | 156—592 X |
| 3,220,057 | 11/1965 | Walton (II) | 156—592 X |
| 3,347,136 | 10/1967 | Kure | 93—1 |
| 3,383,449 | 5/1968 | Muller | 93—1 |
| 3,398,223 | 8/1968 | Schatz | 264—282 |
| 3,414,649 | 12/1968 | Heede | 93—1 |
| 3,418,890 | 12/1968 | Tachibana | 93—1 |
| 3,383,449 | 5/1968 | Muller | 264—287 |
| 3,453,351 | 7/1969 | Callahan | 264—47 |

FOREIGN PATENTS

| | | |
|---|---|---|
| 747,107 | 11/1966 | Canada. |
| 1,014,920 | 8/1957 | Germany. |

WAYNE A. MORSE, Jr., Primary Examiner

U.S. Cl. X.R.

53—59; 83—79, 157; 93—1.1, 1.5, 84, 93; 156—592